United States Patent [19]
Johansson et al.

[11] 4,164,160
[45] Aug. 14, 1979

[54] TRANSVERSE CUTTER

[75] Inventors: Jan-Olof Johansson, Hoganas; Heikki Korpela, Helsingborg; Karel Spacek, Morarp, all of Sweden

[73] Assignee: Gullfiber AB, Billesholm, Sweden

[21] Appl. No.: 889,907

[22] Filed: Mar. 24, 1978

Related U.S. Application Data

[63] Continuation-in-part of Ser. No. 755,019, Dec. 28, 1976, Pat. No. 4,117,754.

[30] Foreign Application Priority Data

Mar. 25, 1977 [SE] Sweden ............................ 7703474

[51] Int. Cl.² .................... B23D 25/04; B26D 1/56
[52] U.S. Cl. .................... 83/307.2; 83/319; 83/578
[58] Field of Search ............ 83/307.2, 318, 319, 83/307.1, 327, 328, 320, 578

[56] References Cited
U.S. PATENT DOCUMENTS 4,117,754 10/1978 Johansson et al. ............. 83/307.2

Primary Examiner—Donald R. Schran
Attorney, Agent, or Firm—Birch, Stewart, Kolasch & Birch

[57] ABSTRACT

An apparatus for cutting a cellular plastic web emerging from a web forming machine into a plurality of predetermined lengths is described. A cutting device including a plurality of mutually spaced filaments is provided on a movable carriage slidably supported on a support stand. The filaments extend transversely of the carriage and the direction of the web emerging from the forming machine. The carriage is mounted on the stand for reciprocating sliding movement. In one direction of traverse, the carriage moves in synchronism and in the same direction as the web and simultaneously divides the web into separate lengths by means of transverse cutting devices. The filaments move alternately toward and away from the carriage to cut the web during successive synchronized movements of the carriage and web. Further, the filaments may be horizontally moved to cut profiles other than straight, vertical sections in the separate lengths of the web.

3 Claims, 3 Drawing Figures

TRANSVERSE CUTTER

CROSS-REFERENCE TO RELATED APPLICATIONS

This application is a continuation-in-part of our co-pending U.S. application Ser. No. 755,019, filed Dec. 28, 1976, now U.S. Pat. No. 4,117,754 issued Oct. 3, 1978.

BACKGROUND OF THE INVENTION

1. Field of the Invention

The present invention is concerned with a means for transverse cutting of a web of cellular plastic fed continuously out of a forming machine, which means includes a stand-mounted reciprocating carriage moving in synchronism with the web in the direction of traverse and at the same time dividing the web into separate lengths by means of transverse cutting devices. These cutting devices consisting of mutually spaced filaments extending transversely across the carriage capable of simultaneous motion perpendicular and horizontal to the plane of the carriage. During successive synchronized tranverses of the carriage in the direction of the web, the cutting devices cut alternately towards and away from the plane of the carriage in the manner described in our co-pending U.S. application Ser. No. 755,019, filed Dec. 28, 1976.

2. Description of the Prior Art

The device described in our co-pending U.S. application Ser. No. 755,019, filed Dec. 28, 1976, is designed to cut only straight, vertical sections in the cellular plastic web. However, the edge or profile of the cut sides of the cellular plastic tiles produced by this method must commonly be given a different form to permit adjacent tiles to overlap each other. In this manner, considerably less heat is lost than if vertically cut tiles are set side by side. For instance, the procedure for producing insulating tiles with flanged edges on all sides in a continuous process has hitherto been as follows:

The cellular plastic web fed continuously out of a forming machine is fed into a machine provided with edge cutters, which produce the desired flange shape along the two sides of the cellular plastic web in a longitudinal direction. The web is then cut into tiles in the transverse cutter described above, the cuts thus produced being straight and vertical. Having passed through this cutter, each tile must be guided out of the machine in a direction perpendicular to the earlier direction of travel and passed through a second machine provided with edge cutters which cut the desired shape of flange along the two transverse sides of the tile. After this process, the direction of feed of the tile must twice more be changed by 90° before the tile again reaches the original production line, along which it is conveyed for further processing and/or treatment.

SUMMARY OF THE INVENTION

The purpose of the present invention is to improve the cutter described in our co-pending application in such a manner as to allow the desired profile to be cut in the edge transversely across the direction of the web at the same time as the web itself is cut. This permits the production line to run in the same direction at all points. The tiles, once cut, will not need to be diverted from the line, and edge-cutters will therefore not be necessary.

A cutting device of the type described in our co-pending application, which further meets the requirements specified above, is characterized in this invention chiefly by filaments arranged so as to be capable of horizontal motion in the plane of the carriage and allowing the cutting of profiles of other than straight, vertical section.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
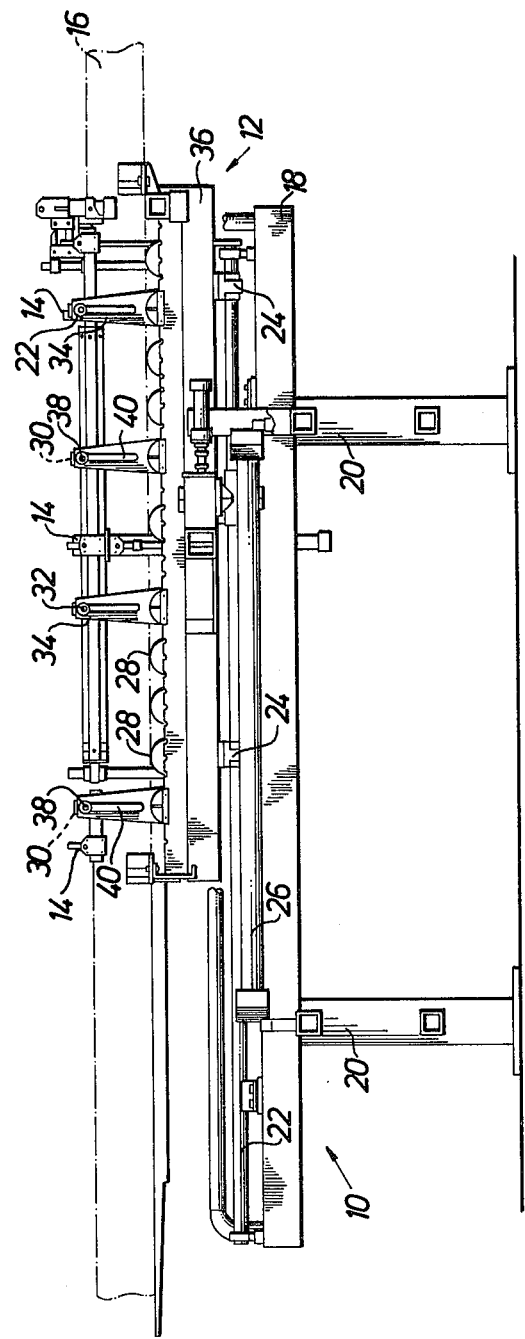
FIG. 1 shows an elevation of a cutter designed in accordance with the principles of our copending application, mounted on a stand, and easily modifiable so as to allow the cutting of profiles of other than straight, vertical section.

The cutter illustrated in FIG. 1 includes a reciprocating carriage 12, mounted on a stand, the carriage being equipped with three cutting devices 14 in the form of mutually spaced filaments stretched transversely across the carriage 12 and capable of moving parallel to each other and perpendicular to the plane of the carriage. The cellular plastic forming machine is not shown but is imagined as being located to the right of the cutter, and the cellular plastic web 16 therefore moves from right to left in the figure. The stand 10 comprises a supporting frame constructed of transverse and longitudinal beams, of which only one, longitudinal, beam 18 is shown in the drawing, supported on four legs 20. The carriage 12 is mounted to slide on two separate guide shafts 22 attached to the frame, and the drawing shows two sliding mountings 24 attached to the underside of the carriage 12 and each gripping one of the guiding shafts 22 to allow sliding motion with respect to the shafts. The carriage 12 is powered by a driving cylinder 26 which is coupled directly to the underside of the carriage. The part of the carriage 12 designed to support the cellular plastic web 16 comprises a number of parallel supporting rollers 28 located transversely across the carriage. In addition, a number of pressure rollers 30 (obscured in the drawing) press upon the top side of the web 16, their height above the supporting rollers 28 being adjustable depending on the thickness of the web 16. For this purpose the ends of the pressure rollers 30 can be fixed by means of locking devices 32 relative to brackets 34 projecting up from the sides of the base 36 of the carriage 12. Journals 38 at the ends of the rollers pass through elongated vertical slots 40 in the brackets. For further details concerning the described cutter, see our co-pending U.S. application Ser. No. 755,019, filed on Dec. 28, 1976, now U.S. Pat. No. 4,117,754 which is incorporated herein by reference.

Figure 2:
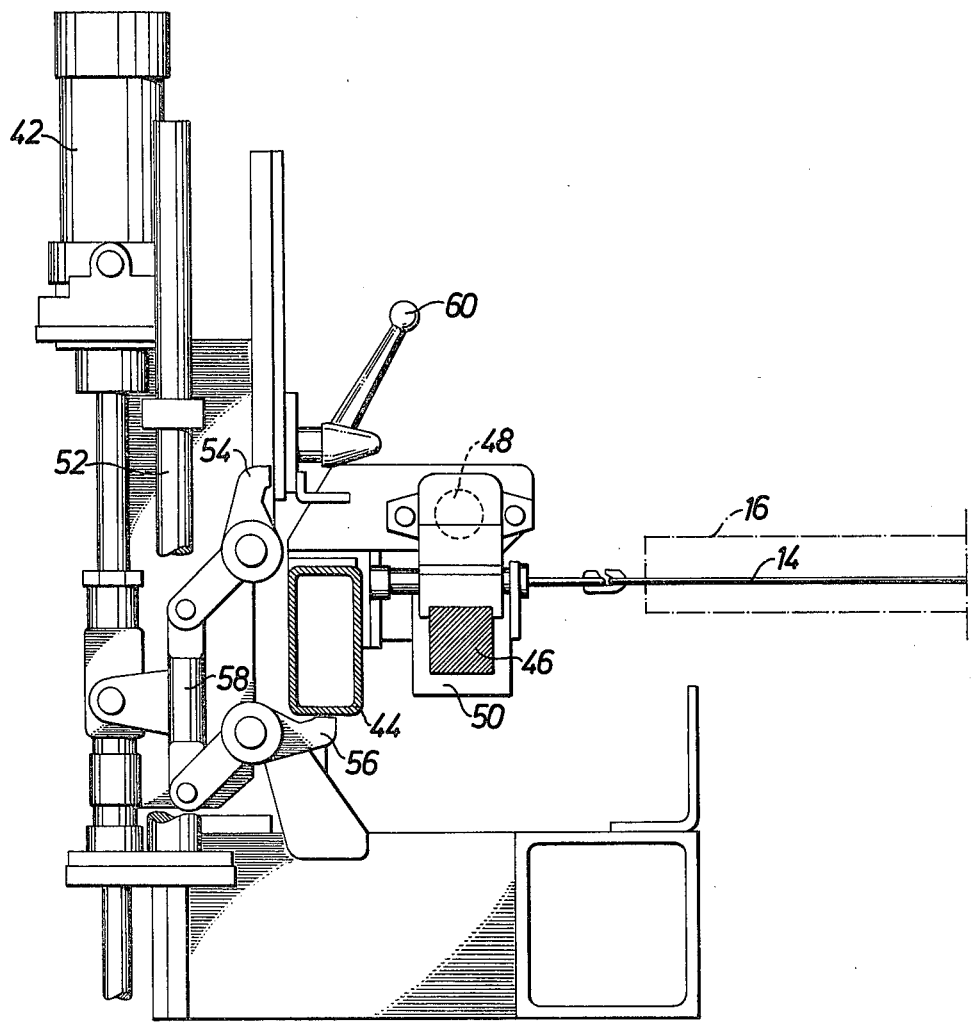
FIG. 2 is a diagrammatic section, seen from the side, showing the structure of an arrangement whereby the filaments of a cutting device, as shown in FIG. 1, may also be moved horizontally in the plane of the carriage.
Figure 3:
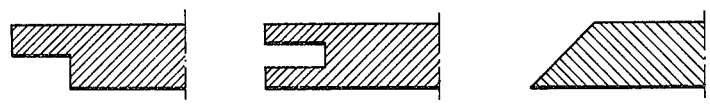
FIG. 3 shows sections, seen from the side, of the edges of tiles in which various different profiles have been cut by means of the new cutting device.

The known transverse cutter may be modified with regard to certain components in accordance with this invention, as illustrated in FIG. 2. In this version, a cylinder 42 is mounted at approximately the middle of a bar 44, providing vertical motion relative to the direction of feed of the cellular plastic web 16.

A supporting bar 46, to which the ends of the filaments 14 are attached, runs parallel to each bar 44. It should be remarked that this arrangement is symmetrical and that a corresponding arrangement is naturally provided on the opposite side of the cutter. The motion of the supporting bar 46 in a horizontal direction relative to the bar 44 is controlled by a driving cylinder 48 located above the supporting bar 46. The cylinder 48 may thus be attached to the supporting bar 46, while the end of the corresponding piston rod is attached to the bar 44. The direction in which the supporting bar 46 is driven is controlled by guides 50. Guiding devices 52 are also provided to control the movement of the bar 44 in a vertical direction.

The bar 44, moveable in a vertical direction through the action of the cylinder 42, is so arranged as to enable it at points on its vertical path to act on two stop lugs, 54 and 56, one of the stop lugs 54 being provided for ascending motion, the other 56 for descending motion. The stop lugs 54, 56, may be linked together—by a link 58—in such manner that when activated they respectively open or close an electric switch, not shown in the drawing, providing pulses to start or stop the driving cylinder 48.

An adjusting lever 60 is provided for adjustment of the position of the lugs 54, 56, relative to each other and to the cellular plastic web and so enables the desired profile to be cut. It should, of course, be noted that the bar 44 and the mounting bar 46 can be moved simultaneously to allow diagonal cutting of the web.

The embodiment illustrated in FIG. 2 shows, naturally, only one version of the invention, which may be modified within the limits of the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for transverse cutting of a web of cellular plastic fed continuously out of a forming machine comprising:
    a support stand;
    a carriage means disposed in a plane and mounted for reciprocating motion on said support stand;
    a plurality of cutting devices comprising mutually spaced hot filaments reciprocably mounted on and extending transversely across said carriage means;
    means for moving said carriage means in successive synchronized traverses with said web and simultaneously moving said plurality of cutting devices perpendicular to the plane of said carriage;
    said means for moving said carriage means in successive synchronized traverses with said web moves said plurality of cutting devices towards said carriage means from above said web and alternately moves said plurality of cutting devices away from said carriage means from below said web during successive synchronized traverses of said carriage means in the direction of motion of said web to divide said web transversely into separate lengths by means of said cutting devices; and
    means for moving said plurality of cutting devices in a horizontal motion in the plane of said carriage means to cut profiles in said separate lengths of said web.

2. An apparatus according to claim 1, wherein driving cylinders are arranged so as to impart to a supporting means of said plurality of cutting devices a horizontal motion with respect to the rest of said carriage means.

3. An apparatus according to claim 2, wherein driving cylinders are arranged so as to be controlled by guiding devices according to the vertical position of said plurality of cutting devices relative to said web.

* * * * *